United States Patent [19]
Clarke et al.

[11] 3,769,709
[45] Nov. 6, 1973

[54] INDEXING OF PLANE SHAPES

[75] Inventors: Eric C. Clarke, Winterskloof; Iain Hardy Lindsay, Pietermaritzburg, both of South Africa

[73] Assignee: Profile Identification (Proprietary) Limited, Pietermaritzburg-Province of Natal, South Africa

[22] Filed: Jan. 27, 1971

[21] Appl. No.: 110,148

[30] Foreign Application Priority Data
Jan. 29, 1970  South Africa.......................... 70637

[52] U.S. Cl....................... 33/1 BB, 33/1 D, 33/1 C
[51] Int. Cl............................ G01b 3/00, G06k 9/00
[58] Field of Search ...................... 33/1 R, 1 B, 1 C, 33/1 D, 1 G, 1 K, 1 N, 1 BB, 64 D, 228

[56] References Cited
UNITED STATES PATENTS

| | | | |
|---|---|---|---|
| 2,007,589 | 7/1935 | Williams | 33/1 BB |
| 3,340,784 | 9/1967 | Zimberoff | 33/1 R X |
| 2,203,674 | 6/1940 | Dashefsky | 33/1 C UX |
| 1,311,995 | 8/1919 | Power | 33/1 R |
| 1,415,833 | 5/1922 | Ginsburg | 33/64 D X |
| 3,401,458 | 9/1968 | Mora | 33/1 C |

*Primary Examiner*—Robert B. Hall
*Attorney*—Karl W. Flocks

[57] ABSTRACT

A method of measuring and indexing plane shapes or profiles, particularly the profiles of dies for extruded shapes or sections. The measurements are taken in a form and manner suitable for recording in a computer memory. Thereby identification and retrieval of dies previously made and having shapes and sizes comparable with each other, are facilitated. Thereby also unnecessary duplication of dies may be avoided. Final comparison of shapes is made by visual inspection. Also a device for measuring plane shapes or profiles in accordance with the method.

6 Claims, 6 Drawing Figures

INDEXING OF PLANE SHAPES

This invention relates generally to the measuring and indexing of shapes or profiles. It relates in particular to the measuring and indexing of two-dimensional shapes, such as dress patterns, shoe leather patterns, and cross-sectional profiles of rolled or extruded members. It relates also to dies for cutting such shoe leather patterns, or for rolling or extruding such members. It relates further to a method of manufacturing which includes such measuring and indexing.

The invention provides a method of measuring a plane shape or profile, which comprises the steps of establishing a major axis passing through the two furthest apart points on the outline of the shape or profile, and establishing a minor axis at a predetermined angle thereto, the minor axis passing through that point on the outline of the shape or profile which is the maximum distance from the major axis, to define an origin at the intersection of the two axes; and of then measuring the lengths of the radius vectors along the arms of the axes from the origin to the outer periphery of the shape or profile at various predetermined angular displacements about the origin.

The invention also provides a method of indexing plane shapes or profiles which includes the step of measuring a plane shape or profile as described above, and of then taking up such measurements in an index together with similar measurements for other similar shapes or profiles.

The invention further provides a method of manufacturing an object of predetermined shape or profile by means of a die, which includes the steps of projecting the object onto a plane surface to provide a plane shape or profile thereof; of measuring the plane shape or profile as described above; of comparing the measurements so taken with similar measurements of dies; and of selecting a die of suitable size and shape on the basis of such measurements for the manufacture of the said object of predetermined shape or profile.

The major and minor axes may be arranged to intersect at right angles to each other. The major axis is the longest axis irrespective of whether the major arm of that axis is longer or shorter than the major arm of the minor axis.

The lengths of the radius vectors may be measured in any convenient units. The readings will then be written in a particular form and in a particular order. The numbers in this form and order for the various shapes may then be recorded and indexed in coded tabular form, or may be recorded in code by a computer.

In order to bring the numbers to manageable form, magnification or multiplication factors may be introduced as part of the index or code number. The lengths of the units may be in feet, inches, centimeters, or millimeters, as desired, with or without multiplication factors. This additional code or index number may be entered at the beginning or end or anywhere else in the number, as desired.

Depending upon the degree of accuracy required in indexing, a larger or smaller number of radius vector readings may be taken. The applicants have found that radius vector readings at 45° intervals, giving a set of eight readings, are usually sufficient for most purposes. The 45° intervals are defined by the major and minor axes and by axes bisecting the angles between the major and minor axes. However, more readings at smaller angular intervals, may be taken if desired.

Thus, the index or code number will be constituted by two readings taken for the opposite ends of the major axis, two readings taken for the minor axis, at right angles to the major axis, and two readings taken for each of the subsidiary axes disposed at predetermined intervals between the major and minor axes.

The taking of the readings may include the following further conventions:

a. the radius vector reading along the major arm of the major axis is always the first reading; and b. thereafter radius vector readings are taken along the shortest route clockwise or anti-clockwise as the case may be, in the direction towards the major arm of the minor axis, and then around readings for the various other axes.

The shape of the figure or section may be such that the arms of the major axis are equal in length, or the major arms of the major and minor axes may be of equal length. Again, it may be possible in some instances to have two different origins, e.g. two different minor axes whose major arms are of equal length. The second origin is determined in the same manner as defined above. In such circumstances the shape or section will be indexed under two or more index or code numbers following the procedure described above.

Te invention extends also to a recording to index of measurements of a plurality of plane shapes or profiles, the measurements being taken radially in predetermined units of length at predetermined angular intervals.

The recording may include additional factors or code numbers or characteristics which may relate to one or more of the features of multiplication, asymmetry, symmetry about one axis, and symmetry about two axes.

The recording may be in tabular form, suitable for being read out by inspection. Alternatively, the recordings may be a computor recording which can be read out, processed or retrieved by computer.

Accordingly, the invention extends also to such a recording.

The invention extends yet further to an apparatus for measuring a plane shape or profile in accordance with the method as described, which comprises a transparent member having a plurality of pairs of axes marked thereon, the axes being at predetermined angular spacings and intersecting at an origin and having units of length uniformly marked along the arms of the axes from the origin, whereby the radius vectors may be measured in the said units of length along the arms of the axes from the origin.

The axes may be graduated in a number of different length units according to different scales.

The invention will now be described by way of example, with reference to the accompanying drawings.

Referring to FIGS. 1, 2, 3, and 5 of the drawings, the axes are so set up that the axis 1–0–5 is the major axis, i.e. the longest axis. The arm 1–0 is regarded as the major arm of the major axis. T8e minor axis 3–0–7 is at right angles to the major axis. The major arm of the minor axis is 3–0. The major and minor axes extend across the maximum outside dimensions of the shape to be measured or indexed. Additional axes between these already set up, are provided, namely 2–0–6 and 4–0–8. These axes together constitute a set of axes having arms disposed at 45° intervals about the origin.

Once the axes have been set up, readings are taken at the points of intersection of the outline of the section with the arms of these axes. It will be noticed that the arms of the axes are marked off in length units. The nearest length unit beyond the point of intersection is regarded as being the appropriate reading for that arm of a particular axis.

Figure 1:
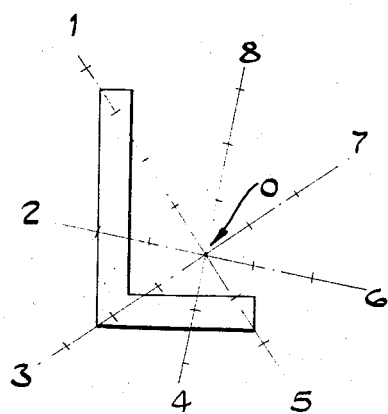
FIG. 1 shows a method of obtaining the polar co-ordinates of an L-section, in accordance with the invention.
Figure 2:
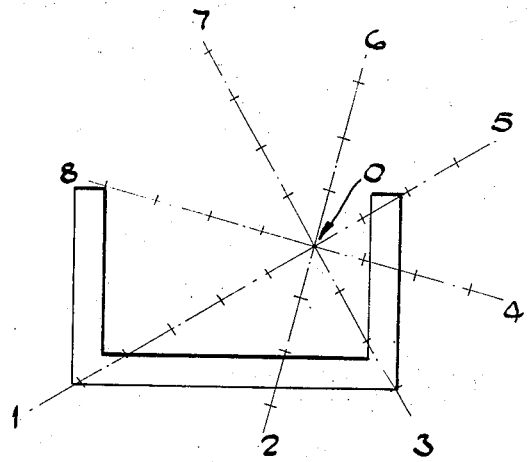
FIG. 2 shows a further section which is symmetrical about one axis, and a method of measuring its polar co-ordinates in accordance with the invention.
Figure 3:
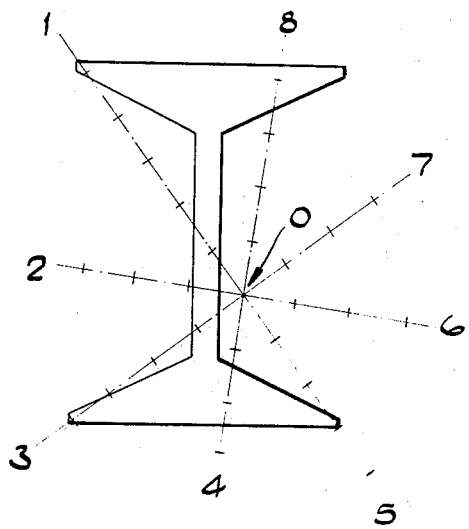
FIG. 3 shows a section which is symmetrical about two axes at right angles to each other, and the method of measuring in accordance with the invention.
Figure 4:
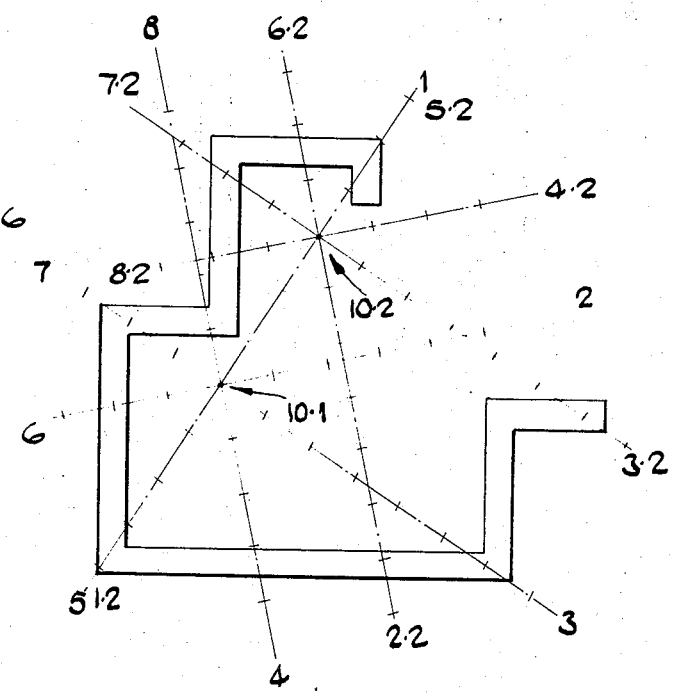
FIG. 4 shows an intricate asymmetrical rectangular shape and two possible methods of measuring the polar co-ordinates according to the invention.
Figure 5:
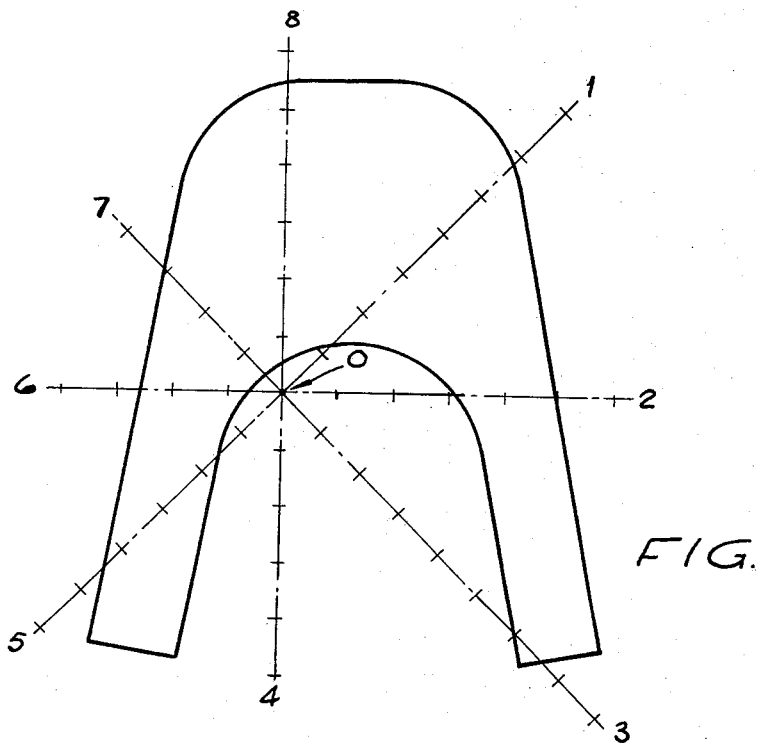
FIG. 5 shows an irregular shape, such as for example a shoe leather shape, and a method of measuring according to the invention.

The shape of FIG. 4 has two possible origins, namely 10.1 and 10.2, with two possible sets of axes. The arms of the one set having their origin at 10.1, have been numbered in the same way as the arms of the sets for the other figures. The arms of the other set having their origin at 10.2, have been numbered 1.2, 2.2, 3.2, 4.2, 5.2, 6.2, 7.2, and 8.2 respectively.

The readings corresponding to the arms for the various axes, and for the various figures, are set out in the following table:

| FIG. | Arm 0–1 | Arm 0–2 | Arm 0–3 | Arm 0–4 | Arm 0–5 | Arm 0–6 | Arm 0–7 | Arm 0–8 |
|---|---|---|---|---|---|---|---|---|
| 1 | 4 | 2 | 3 | 2 | 2 | 0 | 0 | 0 |
| 2 | 6 | 3 | 3 | 2 | 2 | 0 | 0 | 0 |
| 3 | 6 | 1 | 5 | 3 | 3 | 0 | 0 | 5 |
| 4 | 5 | 0 | 7 | 4 | 5 | 3 | 3 | 2 |
| (origin 10.1) | | | | | | | | |
| | 8 | 7 | 7 | 0 | 2 | 2 | 3 | 3 |
| (origin 10.2) | | | | | | | | |
| 5 | 6 | 5 | 8 | 0 | 6 | 3 | 3 | 6 |

The index number for the shape or section of a particularly Figure, will then be represented by the series of numbers occurring in the line opposite that figure number in the table above.

If desired, additional factors or codes or characteristic numbers may be added to indicate other features or characteristics, such as for example multiplication or magnification factors. Furthermore, a further code number may be provided for example, for symmetry about a single axis. Conveniently, this code number may be 1. If the shape or section is symmetrical about two axes, then the additional code number may be 2. Likewise, the shapes or sections may be indexed for other characteristics, thus for example, a Z-section which constitutes two halves, one half being the mirror image of the other, may likewise be indexed or given a code number, for example, 4.

These additional code numbers for additional characteristics, may be added in front of or behind the dimensional code numbers appearing in the table above. All the numbers will occur in a predetermined order, and all the numbers together will then constitute the index number which is characteristic of the particular shape or section which is being indexed.

In practice, if a new shape is to be cut, or if a new section is to be extruded, then the shape or the section will be measured in a manner as described above in accordance with the method of the invention. The characteristic numbers for the shape or section will then be checked against the characteristic numbers of existing stocks of dies to ascertain whether or not there are dies already in existence having dimensions which correspond closely with the dimensions of the new shape or section. From the index or from the computer, it may appear that there are a number of similarly indexed shapes or sections. The dies for these shapes or sections may then be located and the final selection or comparison may be made by visual inspection. Thus it may be found that there is a die in existence which is already so close to the desired dimensions that the making of a new die is not necessary.

Variations in taking the readings, is possible. However, such variations do not depart from the spirit of the invention. Thus for example, instead of following the convention of starting the taking of readings with the major arm of the major axis, and following by the shortest route to the major arm of the minor axis, another convention may be adopted, namely the major arm of the major axis may always be arranged to extend upwardly and such that the major arm of the minor axis extends to the left. There may then be a further convention of either taking the readings clockwise or anti-clockwise, as desired. Furthermore, for shapes which are symmetrical about one axis, measurements may be taken only of one-half of such shape, which will then be indexed together with a code number indicating symmetry about a single axis. Likewise, for shapes which are symmetrical about a pair of axes, only a quarter of the shape may be indexed, together with a suitable index or code number indicating that a quarter of the shape has been indexed, or indicating that the shape is symmetrical about two axes.

Figure 6:
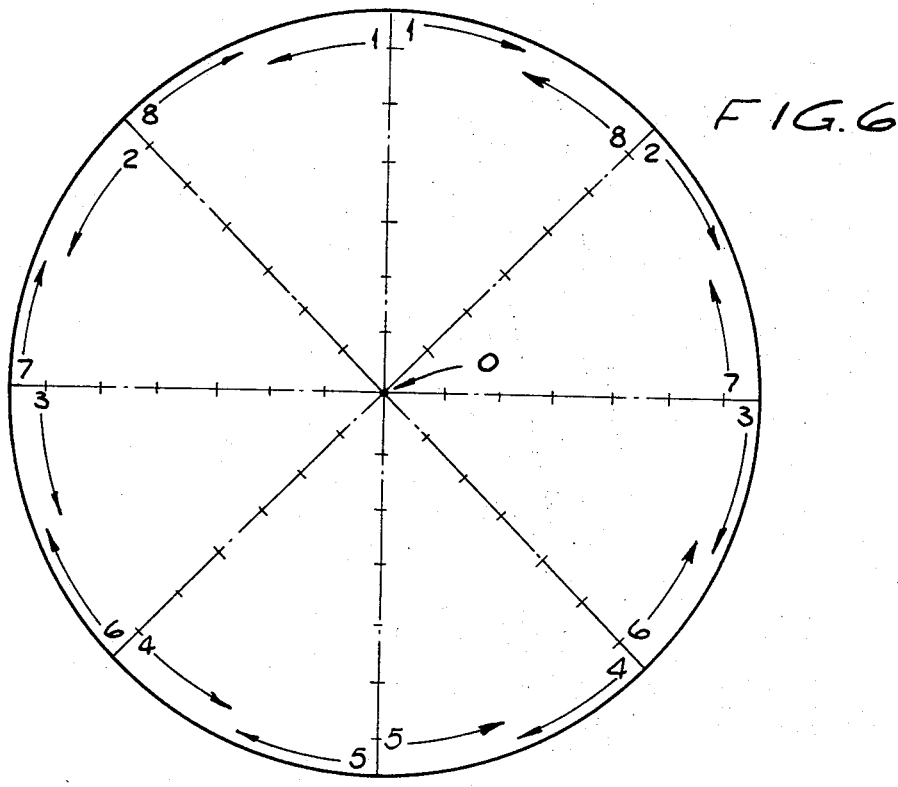
FIG. 6 shows a plan view to a reduced scale of a measuring device for making the measurements according to the invention.

Referring to FIG. 6 of the drawings, there is shown a transparent disc 20 having axes at 45° spacing intersecting at 0. The arms of the axes are marked consecutively in clockwise and anti-clockwise fashion. The arms are also marked off in length units. The length units are conveniently such that the recordings will be single integers only.

Variations in the method of measurement may be adopted. As mentioned above, the length unit reading to the nearest unit beyond the points of intersection can be taken. Instead, the length readings of the points of intersection may be taken to the nearest unit or to the nearest unit nearer the origin. Where the point of intersection is exactly midway between two unit markings, then two readings will be taken. Also in such circumstances, it desirable be desiredable to index a particular shape or profile under different index numbers.

We claim:

1. A method of measuring a plane shape which comprises the steps
   i. of establishing a major axis as a line passing through the two furthest apart points on the outline of the plane shape, and establishing a minor axis as a line at a predetermined angle thereto, the line of the minor axis passing through that point on the outline of the plane shape which is the maximum distance from the major axis, to define an origin at the intersection of the two axes; and ii. of then measuring the lengths of the radius vectors along the lines of the axes from the origin to the outer periphery of the plane shape at various predetermined angular displacements about the origin.

2. A method as claimed in claim 1, in which the major and minor axes are arranged at right angles.

3. A method as claimed in claim 1, wherein the radius vectors are the eight vectors defined by the lines of the major and minor axes, and by the lines of axes bisecting the angles between the major and minor axes.

4. A method as claimed in claim 1, wherein at least one further origin is provided by a further minor axis inter-secting the major axis, and wherein lengths of the radius vectors from the further origin to the outer periphery of the plane shape, are measured at predetermined angular displacements about the said further origin.

5. A method of indexing plane shapes, which includes the step of measuring a plane shape as claimed in claim 1, and of then taking up such measurements in an index together with similar measurements for other similar plane shapes.

6. A method of selecting a die for the manufacture of an object of predetermined plane shape, which includes the steps i. of obtaining a projection of the object in the form of a plane shape;

ii. of establishing a major axis as a line passing through the two furthest apart points on the outline of the plane shape, and establishing a minor axis as a line at a predetermined angle thereto, the line of the minor axis passing through that point on the outline of the plane shape which is the maximum distance from the major axis, to define an origin at the intersection of the two axes;

iii. of then measuring the lengths of the radius vectors along the lines of the axes from the origin to the outer periphery of the plane shape at various predetermined angular displacements about the origin;

iv. of comparing the measurements so taken with similar measurements of dies; and v. of selecting a die of suitable size and shape on the basis of such measurements for the manufacture of the said object of predetermined plane shape.

* * * * *